United States Patent [19]

Simon

[11] Patent Number: 5,205,464
[45] Date of Patent: Apr. 27, 1993

[54] METHOD FOR FORMING A LIGHTWEIGHT FLANGED AXLE SHAFT

[76] Inventor: Joseph Simon, 237 Lothrup, Grosse Pointe Farms, Mich. 48236

[21] Appl. No.: 811,452

[22] Filed: Dec. 19, 1991

[51] Int. Cl.$^5$ .............................................. B23K 20/12
[52] U.S. Cl. ................... 228/114; 228/173.4
[58] Field of Search ............... 228/112, 113, 114, 125, 228/173.4, 176

[56] References Cited

U.S. PATENT DOCUMENTS

| | | | |
|---|---|---|---|
| 3,631,585 | 1/1972 | Stamm | 228/112 |
| 3,886,649 | 6/1975 | Simon | 228/112 |
| 4,087,038 | 5/1978 | Yagi | 228/112 |
| 4,223,825 | 9/1980 | Williams | 228/114 |
| 4,487,357 | 12/1984 | Simon | 228/114 |
| 4,659,005 | 4/1987 | Spindler | 228/112 |

Primary Examiner—Samuel M. Heinrich
Attorney, Agent, or Firm—Harness, Dickey & Pierce

[57] ABSTRACT

A method for forming a lightweight flanged axle shaft particularly for use within automotive vehicles for transmitting power from a power source, such as the differential, to a driven wheel. The method includes extruding a tubular blank through a die throat by pushing the blank through the die throat and causing the blank to collapse inwardly around a mandrel-like member located within the die throat to thereby form an elongated, thin wall, hollow tube. A flange member is separately forged out of metal with a disk-like flange and central cup-shaped hub whose free edge is of approximately the same size and thickness as the end of the shaft. The flange hub and the shaft end are welded together, face to face, by engaging the two and rapidly spinning one relative to the other to generate sufficient heat and to butt the adjacent faces to fuse them together upon discontinuance of the rotation. This produces a long, hollow, thin wall, lightweight shaft having one end closed by the flange extending laterally thereof. The flange hub and shaft end are integrated to form a one piece unit. The opposite end of the shaft is configured, such as with spline teeth, for fastening one end of the shaft to a drive or driven member while the flange at the opposite end of the shaft is secured to the opposite drive or driven member.

8 Claims, 2 Drawing Sheets

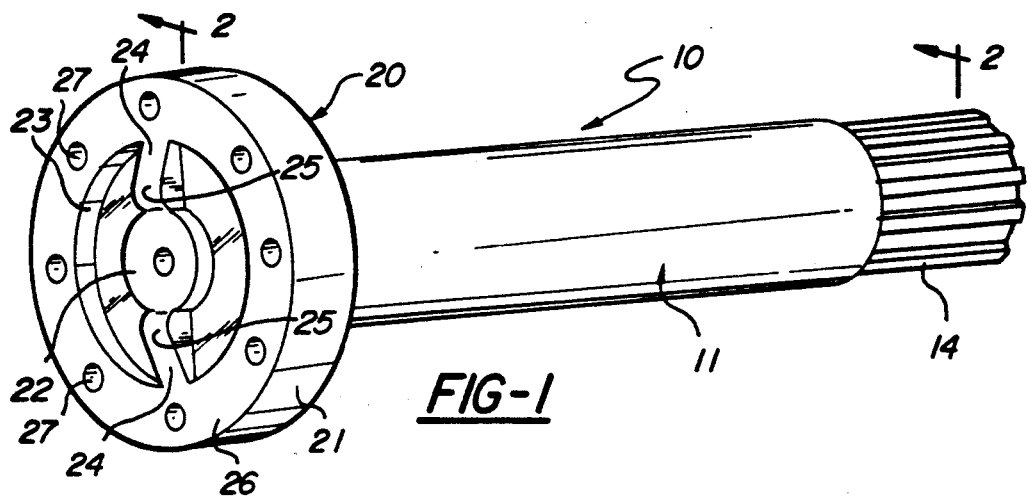
FIG-1
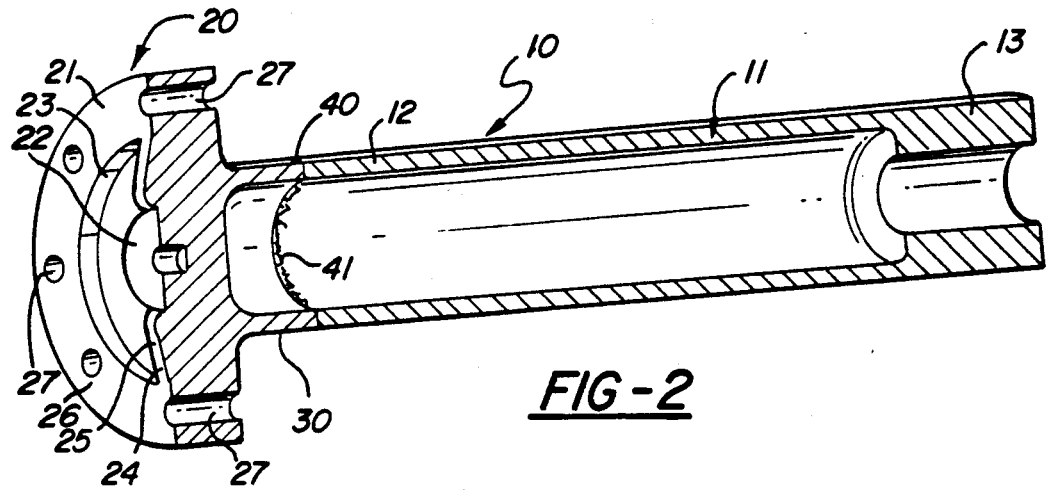
FIG-2
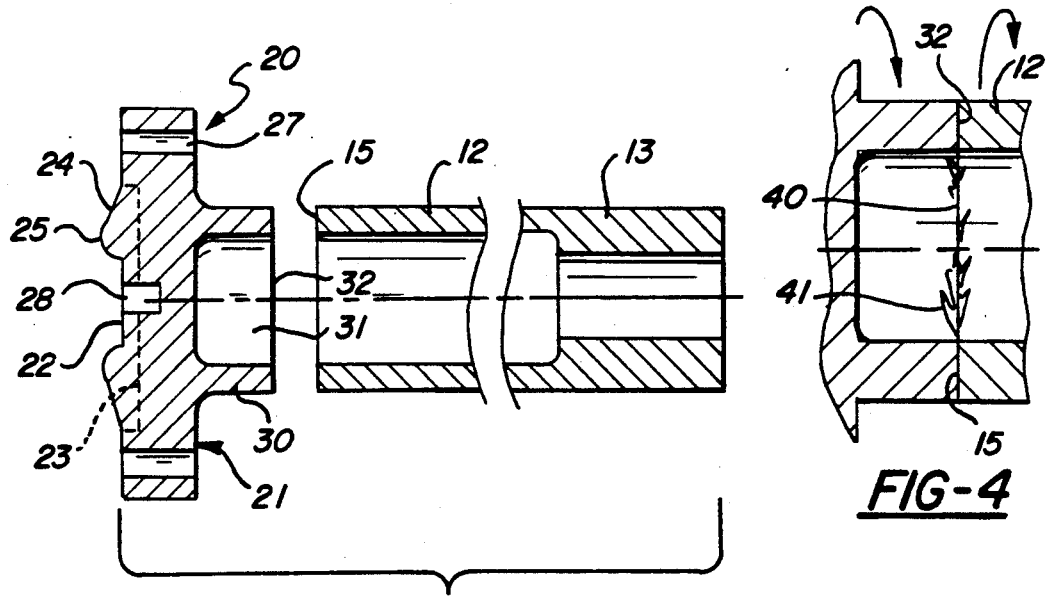
FIG-3
FIG-4

METHOD FOR FORMING A LIGHTWEIGHT FLANGED AXLE SHAFT

BACKGROUND OF THE INVENTION

This invention relates to an elongated, hollow, thin wall, rigid drive shaft having a flange formed on one end and a coupling configuration, such as spline teeth, formed on its opposite end for coupling together a driving and a driven member, such as the differential of an automotive vehicle and a driven wheel.

Drive shafts, particularly for automotive vehicles and trucks, are typically formed of solid metal shafts with their opposite ends formed for connecting to the drive and driven members of the vehicle. For example, a flange may be machined on one end of the shaft and the opposite end of the shaft may be provided with external or internal spline-like teeth so that the shaft may be connected to the differential and to a wheel of the vehicle. Because such drive shafts must transmit considerable torque and are subjected to rapid starts and stops of power transmission, they must be rigid and strong enough to perform under both normal and high overload conditions. Thus, drive shafts are made relatively heavy in order to provide the needed rigidity and strength.

It would be desirable to provide, particularly for automotive vehicle or truck use, a lightweight drive shaft, which nevertheless provides the same rigidity and torque carrying capacity as a solid heavy shaft. This is in accordance with the desire to reduce the weight of automotive vehicles as much as possible so as to reduce vehicle fuel consumption and unslung weight.

One method of reducing a hollow, lightweight shaft is described, in general, in my prior patents which relate to the extrusion of ring-like metal blanks through tubular die throats. The blanks are pushed through the die throats by a suitable punch having an extension which forms a mandrel-like member within the tubular die and blank. In general, this method may be used to produce hollow, thin wall, rigid tubes. By utilizing one or more mandrel-like extension of varying diameters and different punches, a tube may be formed with uniform wall thicknesses, but with thickened wall sections at selected portions thereof. Examples of this system for forming hollow tubes are illustrated, for example, in my U.S. Pat. Nos. 4,002,286 issued Jan. 11, 1977; 4,277,969 issued Jul. 14, 1981; 4,292,831 issued Oct. 6, 1981; 4,435,972 issued Mar. 13, 1984 and 4,991,421 issued Feb. 12, 1991. These patents illustrate methods for forming hollow tubes for various purposes with pre-selected wall thicknesses.

Thus, the invention herein relates to a method for forming a hollow, extruded metal axle shaft upon whose end a pre-formed forged metal flange is fastened for inexpensively fabricating a lightweight shaft with adequate strength and rigidity for its required purpose.

SUMMARY OF THE INVENTION

This invention contemplates a method for forming a light weight flanged end shaft by, first, extruding a tubular metal blank through a tubular die having a restricted die throat to form an elongated, thin wall, hollow, rigid shaft. The extrusion is accomplished by inserting a short, tubular metal blank within the die and then pushing the blank through the die throat by means of a punch. The punch has a mandrel-like extension arranged within the blank and the die throat so that the blank may collapse about the extension for forming the required interior diameter of the tube while the exterior of the tube is formed by the die throat. By utilizing more than one mandrel-like extension and/or more than one punch, selected portions of the tube may be inwardly thickened, as for example, along the lead end of the extruded tube for the purpose of providing material for the formation of spline-like teeth or the like. The trailing end of the extruded tube forms a blunt, annular surface.

A flange member is separately hot forged, stamped or cold formed. The flange member is in the shape of a generally disk-like flange having a central, integral hub. The hub is generally cup-like in shape. That is, the hub is short and hollow with a free, annular, blunt edge which duplicates in size and thickness, the free, blunt end surface of the shaft. The hub is closed, like a cup, by the portion of the flange which the hub overlaps.

The flange hub is pressed, in face to face contact, against the blunt free end of the shaft and one member is rapidly rotated relative to the other to generate sufficient heat to melt the adjacent surfaces. Thus, when the rotation is stopped, the two surfaces are butted together which fuses them to form a weld. Meanwhile, molten metal, which typically forms a rams horn style flash in this type of fastening operation, is squirted inwardly and outwardly. The inward flash flows into the interior of the hollow cup-like hub and shaft where the flash solidifies and may remain. The outward flash, if desired, is sheared off.

A significant object of this invention is to provide a lightweight drive shaft which, nevertheless, is at least as strong and preferably is stronger than a solid shaft and is sufficiently rigid for the transmission of torque from a driving member to a driven member, such as from a vehicle differential to a wheel.

Another object of this invention is to provide a method for forming a flanged, hollow, lightweight, rigid, strong axle shaft which method is generally less expensive than typical methods.

Still another object of this invention is to provide a method for forming a lightweight, hollow, thin wall, drive shaft with a pre-formed, forged flange integrated with one end of the shaft through a friction welding procedure. By this method, the opposite end of the shaft may be formed with a thickened wall section to enable the formation of spline-like teeth thereon for coupling purposes.

These and other objects and advantages of this invention will become apparent upon reading the following description, of which the attached drawings form a part.

DESCRIPTION OF PREFERRED EMBODIMENTS

FIG. 1 is a perspective view of the lightweight, flanged drive shaft.

FIG. 2 is a perspective, cross-sectional view, of the shaft illustrated in FIG. 1.

FIG. 3 is a cross-sectional, fragmentary view showing the alignment of the forged flange hub with the end of the extruded tubular shaft.

FIG. 4 is an enlarged, fragmentary view of the joint formed during the rapid rotation of the flange hub or shaft relative to one other.

DETAILED DESCRIPTION OF THE PREFERRED EMBODIMENT

Figure 5:
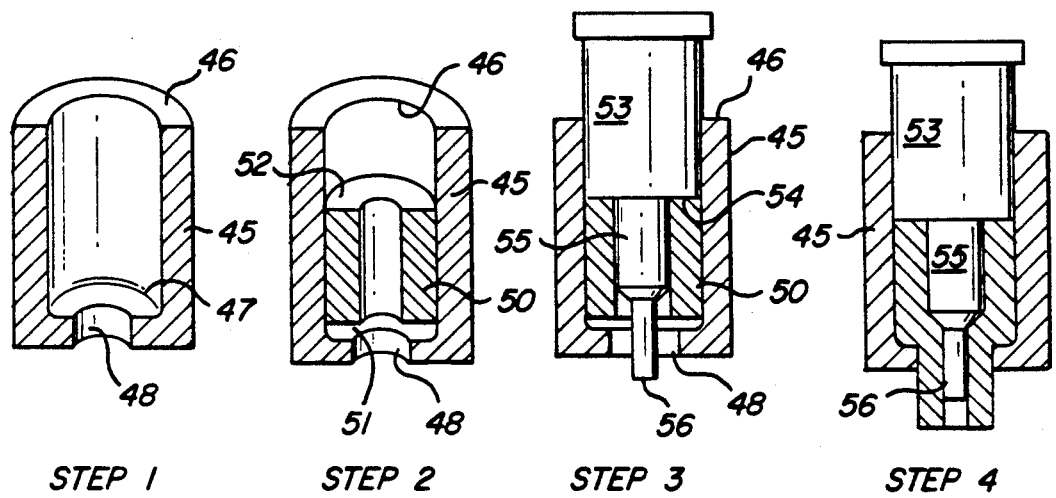
FIG. 5 is a schematic drawing, in cross-section, which illustrates the series of steps in the extrusion of the hollow shaft.
Figure 5:
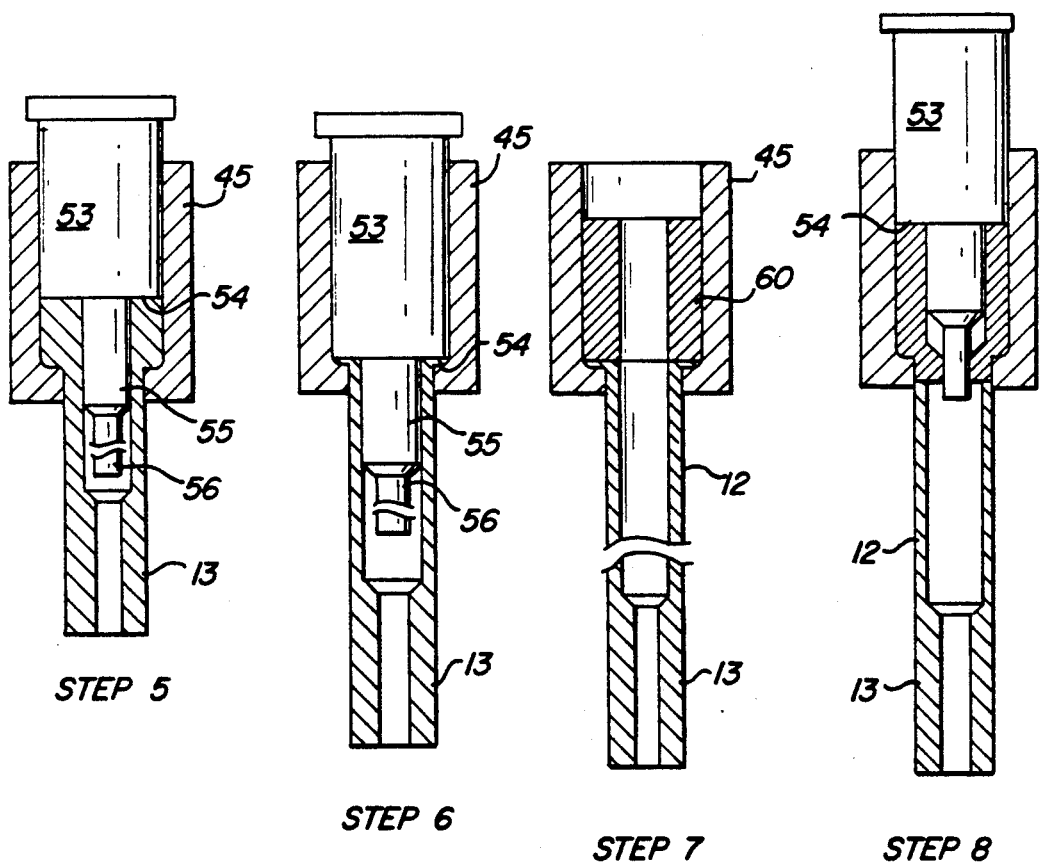

Referring to the drawings, FIGS. 1 and 2 illustrate a lightweight, flanged axle shaft. The shaft is formed of an elongated, hollow shaft portion 11 having a thin wall section 12 and an inwardly thickened, thicker wall sections 13 at both ends. Spline teeth 14 are formed in one of the thicker wall section end for providing a means for coupling the shaft to a driving member or to a driven member as required. By way of example, the spline teeth may be formed for coupling to a automotive vehicle rear differential which will supply power to a wheel through the shaft.

The thin wall section has a uniformed thickness along its length with a uniform outer diameter and inner diameter and terminates in a thickened end which provides a flat, annular end surface 15. The thin wall section may be provided with spaced apart inwardly thickened portions, such as for localized reinforcing purposes or for providing additional metal thickness for machining various desired configurations in the shaft. Preferably, the thin wall section is of uniform thickness as illustrated in FIG. 2 of the drawing.

A forged flange member 20 is secured to the hollow shaft 11 so that the two appear to be one integral article. Preferably, the flange member is formed by hot forging metal between suitable hammer or pressure members using dies to create the desired flange member shape. The flange member illustrated in FIGS. 1-4 includes a disk-like flange 21 whose shape and size may vary, depending upon the coupling requirements. In the drawings, the flange is illustrated as including a center boss 22 which is surrounded by a depressed surface 23. Spoke-like ribs 24 extend oppositely from the boss. These ribs may include projections 25 useful for fitting into or coupling into another member. A rim 26 surrounds the depressed surface 23 and the ribs. Bolt holes 27 are formed in the rim for bolting the flange to a member to which it is to be coupled. In addition, a center hole 28 may be formed in the boss to serve as a guide or locating point.

The flange member includes an integral cup-like shaped hub 30. The hub has a hollow interior 31 which, therefore, forms an annular rim 32. The rim provides a blunt end or annular flat surface.

As schematically illustrated in FIG. 3, the blunt end surface 15 on the hollow shaft 11 and the blunt end surface formed by the annular rim 32 on the hub 30, are aligned axially face to face. The two annular surfaces are of substantially the same size and shape so that there they closely fit together as illustrated schematically in FIG. 4. The two end surfaces are welded together along a weld seam 40. The welding is accomplished by rotating the flange member or the shaft relative to the other at high speed while the surfaces are in contact. The friction between the touching surfaces generates enough heat to melt the respective surfaces. As soon as the rotation is stopped, the two surfaces are butted and fuse together, as illustrated in FIG. 4. The rotation of the member may be accomplished either by rotating either one of the members while holding the other motionless or by rotating both members in opposite directions.

In this welding step, the speed of rotation, the amount of time of rotation required and the pressure between the adjacent surfaces may be varied, depending upon the metals used, surfaces roughnesses, etc. Thus, it may be necessary to determine those factors by trial and error as, for example, utilizing a lathe which holds one of the members stationary and rotates the other member. This permits trying varying speeds and pressures, etc. to determine the optimum conditions.

The foregoing method of welding is known and is used for other purposes. One of the problems that arise in that type of welding is that some small part of the molten metal that is formed during the rotational step tends to squeeze out between the adjacent parts to form a thin rams horn shaped flash. The flash solidifies and forms jagged or rough, thin metal pieces. The flash is directed inwardly and outwardly, as illustrated in FIG. 4. In the inward case, the thin molten metal pieces can flow into the hollow space in the hub and shaft where, when solidified, they do no harm. In the outward case (illustrated in phantom), the flash may be left on the shaft, sheared off or otherwise removed from the outer surface. However, to the extent that flash forms on the outer surface, a suitable cleaning or removal step may be used to smooth the joint portions adjacent the seam 40.

FIG. 5 shows, schematically, a series of steps involved in the formation of the hollow shaft 11. Step 1 illustrates, schematically and in perspective, an open-end die 45 having an upper, inlet end 46. The lower, opposite end of the die is provided with an annular shoulder 47 which forms and surrounds an extrusion die throat 48.

A tubular blank 50 formed of a suitable metal, such as a mild steel or the like, is dropped into the die as shown in FIG. 2. In this case, the lower end of the blank forms the lead end 51 and the upper end forms a trailing end 52.

Next, a punch 53 is inserted in the die. The punch is sized to closely fit within and fill the die. The punch is provided with a lower, annular pressure surface 54 which bears against the trailing end 52 of the tubular blank 50. Thus, the punch may be advanced toward the die throat 48 for pushing the blank through the die throat. Also, the punch may be provided with a thick, mandrel-like, punch extension 55 which fits within the tubular blank.

Step 4 shows the punch advancing towards the die throat and pushing the blank through the die throat. The inward collapsing of the blank material produces the interior diameter of the thickened end of the shaft.

Next, as shown in FIG. 5, the punch continues advancing towards the die throat until the thick mandrel-like punch extension 55 is located within the die throat. Thereafter, the blank is extruded through the die throat around the punch extension 55 to form the thin wall section of the shaft.

The movement of the punch continues, as shown in Step 6, until the blank is substantially extruded through the die throat. At that point, the punch is removed and a second tubular blank 60 is inserted in the die as illustrated in Step 7. Thereafter, the punch is reinserted, as shown in Step 8, and pushes the second tubular blank towards the die throat which extrudes the second blank while releasing the first blank from the die throat with its second thickened end.

As can be seen, variations in the number and locations of the punch extensions can vary the number, location and sizes of different wall thickness sections in the extruded shaft. It is preferable in the formation of a lightweight, rigid and strong drive shaft, which will be subjected to high torques that are suddenly applied and then continuously maintained, to provide a substantially uniform wall thickness calculated to give the maximum strength with minimum weight. The wall thickness itself will depend upon the length of the shaft, the amount of torque or power transmitted anticipated, impact or other applied loads, etc. Thus, this can vary substantially from one shaft to another.

This invention may be further developed within the scope of the following claims.

Having fully described an operative embodiment of this invention, I now claim:

1. A method for forming a lightweight flanged axle shaft and the like, such as for use in transmitting power from the differential of a vehicle to a power driven wheel, comprising:

inserting a tubular blank, having a lead end and trailing end, in a tubular die having an inlet end for receiving the blank and an opposite die extrusion throat through which the blank is extruded starting with its lead end to its trailing end;

moving a punch, which is sized to closely fit within the die, axially within the die towards the die throat for engaging and pushing the trailing end of the blank towards the die throat and, thereby, extruding the blank through the die throat;

providing a mandrel-like extension on the lead end of the punch means and positioning said extension within the blank and the die throat while moving the punch for thereby collapsing the blank radially inwardly as it is moved through the die throat for forming an elongated, hollow, relatively thin wall tube out of the blank which is extruded through the die throat;

separately forming a flange in a generally disk-like, roughly flat shape with a central hub integrally formed on one face thereon and with the hub having roughly the same outer diameter as the outer diameter of an end of said shaft and with the free end of the hub formed with a blunt, flat surface;

positioning the blunt end of the hub against an end of the shaft and aligning the two coaxially;

rapidly rotating the hub or the shaft relative to the other while engaging the adjacent ends of the hub and shaft for generating heat in a sufficient amount to weld the two ends together and then stopping such relative rotation to permit the two ends to fuse together;

whereby an enlongated, hollow, relatively lightweight metal shaft is formed with a laterally extending flange formed on one end thereof, for providing a means for fastening that end of the shaft to a drive or driven member;

and forming a coupling means on the opposite end of the shaft for securing said opposite end to the other of the two driving and driven members.

2. A method for forming a lightweight flanged axle shaft as defined in claim 1, and to form a smaller diameter opening in the lead end portion of the shaft by the extrusion and, thereby, provide a slightly thickened wall thickness along the lead end portion of the shaft as contrasted with the following shaft wall thickness;

forming said coupling means on the thickened portion of said shaft.

3. A method for forming a lightweight flanged axle shaft as defined in claim 2, and including forming spline-like teeth along the outer surface of the shaft along the thickened, lead end portion thereof for providing said coupling means.

4. A method for forming a lightweight flanged axle shaft as defined in claim 2, and including forming spline-like teeth extending parallel to the axis of the shaft, along the interior surface of the lead end portion of the shaft for providing said coupling means.

5. A method for forming a lightweight flanged axle shaft as defined in claim 2, and including forging said flange and its integral hub into the flange end hub shape from heated metal blanks forged within forging pressure members.

6. A method for forming a lightweight flanged axle shaft as defined in claim 2, and including forming said hub in a hollow, cup-like shape so that its rim is of the approximate thickness of the thickness of the wall of the adjacent shaft portion;

applying the edge of the cup-like shaped hub against the end of the shaft for rapidly rotating the hub or shaft relative to the other for welding them together and permitting molten, excess metal to flow outwardly and inwardly of the hub cup-like shape and the hollow shaft so that flash formed from the molten metal flowing inwardly as a result of heating the adjacent ends of the hub and shaft is solidified within and remains within the hollow shaft and hub.

7. A method as defined in claim 6, and including removing the flash on the outside of the shaft.

8. A method as defined in claim 2, and including forming the flange hub in a hollow, cup-like shape and fastening the free edge thereof to the free edge of the adjacent shaft and permitting the flash formed from the molten metal resulting from the fastening of the two adjacent edges to flow outwardly and inwardly and remain inwardly of the hollow shaft and hub;

whereby the hub forms a short extension of the shaft end which is closed by the transversely arranged flange.

* * * * *